United States Patent Office 2,763,634
Patented Sept. 18, 1956

2,763,634

SULPHONATION METHOD

Arthur S. Teot, Midland, Mich., assignor to The Dow Chemical Company, Midland, Mich., a corporation of Delaware No Drawing. Application February 21, 1952,
Serial No. 272,889

9 Claims. (Cl. 260—79.3)

This invention concerns an improved method for sulfonating alkenyl aromatic resins, particularly polystyrene, to produce sulfonated resins which are soluble in water.

By "alkenylaromatic resins" is meant the polymers and copolymers containing, in chemically combined form, 50 per cent by weight or more of at least one alkenyl-aromatic compound having the general formula:

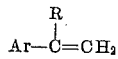

wherein Ar represents a monovalent aromatic radical and R represents hydrogen or a methyl radical. Examples of alkenylaromatic resins which may be sulfonated in accordance with the invention are the solid homopolymers of styrene, alpha-methylstyrene, ar-chlorostyrene, ar-vinyltoluene, and ar-ethylstyrene; copolymers of any two or more of such alkenyl aromatic compounds, e. g. copolymers of styrene and ar-vinyltoluene, or of styrene and alpha-methylstyrene, etc.; and copolymers of one or more of the alkenyl-aromatic compounds with lesser amounts, e. g. up to 50 per cent by weight, of other mono-olefinic hydrocarbons such as butenes, diisobutylene, or pentenes, etc.

The sulfonation of such alkenyl aromatic resins to produce corresponding resin sulfonates which are soluble in water has been described in a co-pending application, Serial No. 231,050, filed June 11, 1951, now U. S. Patent No. 2,640,820 of which the present inventor is a co-inventor. In the co-pending application, there is taught a method of producing water-soluble resin sulfonates which involves admixing sulphur trioxide with an alkenyl aromatic resin while the latter is dissolved in a liquid carbon chloride such as carbon tetrachloride or tetrachloroethylene. Said application teaches that it is important that a liquid carbon chloride be used as the reaction medium, since incompletely chlorinated hydrocarbons such as chloroform or ethylene chloride are readily reactive with sulphur trioxide and, therefore, are not well suited for use as the reaction medium.

It has been found that methylene chloride is an exception to the above teaching and that it is highly resistant, e. g. far more resistant than carbon tetrachloride, to chemical attack by sulphur trioxide. It has further been found that the employment of methylene chloride, either alone or in admixture with other polychlorinated aliphatic hydrocarbons, as a medium for the sulfonation of alkenyl aromatic resin permits production of corresponding water-soluble resin sulfonic acids which are of higher purity, i. e. more nearly free of inorganic impurities, than are obtained by use of such other polychlorinated hydrocarbons alone as the media under otherwise similar reaction conditions.

However, in order to obtain the resin sulfonic acids in a form of high purity, it is necessary that the sulphur trioxide be diluted, e. g. with at least five and preferably 10 or more parts by volume of a substantially inert diluent such as nitrogen, dry air or methylene chloride, prior to being fed to the reaction and that the feed mixture comprising the sulphur trioxide be substantially free of hydrocarbons and chlorinated hydrocarbons other than methylene chloride prior to introduction to the reaction. It is also necessary that the alkenyl aromatic resin be dissolved in a liquid polychlorinated aliphatic hydrocarbon such as methylene chloride, carbon tetrachloride, tetrachloroethylene, or a mixture of two or more of these compounds when treated with the diluted sulphur trioxide and that the liquid medium present in the resultant fully reacted mixture comprise a substantial proportion, e. g. 20 per cent by weight or more and preferably 50 per cent or more, of methylene chloride. The methylene chloride in the reaction mixture may initially be present in the alkenyl aromatic solution or may be introduced together with the sulphur trioxide.

It is because sulphur trioxide is far more reactive with an alkenyl aromatic resin than with liquid polychlorinated aliphatic hydrocarbons that such polychlorinated hydrocarbons other than methylene chloride may be present in the initial resin solution and also in the reaction mixture, i. e. the presence of the resin results in a preferential reaction of the sulphur trioxide with the same. However, the presence of an appreciable proportion, e. g. at least 20 and preferably 50 or more per cent by weight, of methylene chloride in the reaction medium reduces the extent to which side reactions occur and results in formation of a product of improved purity. Methylene chloride alone is preferably used as the reaction medium.

The method involves admixing from 0.8 to 3 molecular equivalents of sulphur trioxide in diluted form with a solution of one equivalent of an alkenyl aromatic resin in a polychlorinated aliphatic hydrocarbon solvent, with formation of a reaction mixture which comprises methylene chloride, while stirring or otherwise agitating the reaction mixture and maintaining it at temperatures between —20° and 45° C., preferably between 0° and 35° C. The methylene chloride does not need to be admixed with both of the reactants prior to introduction of the latter to the reaction, but must be introduced together with at least one of the reactants. By a "molecular equivalent" of the resin is meant an amount of resin containing, in chemically combined form, a total of one molecular equivalent of one or more monomeric alkenyl aromatic compounds. For instance, it is the weight of polystyrene containing one molecular weight of chemically combined styrene.

The diluted sulphur trioxide which is fed to the reaction may be in liquid or gaseous form, e. g. it may be a vapor mixture of sulphur trioxide and an inert gas such as nitrogen or dry air, or it may be a liquid solution of sulphur trioxide in methylene chloride. The resin solution which is used as a starting material preferably contains methylene chloride as the solvent, but the solvent may consist of one or more other liquid polychlorinated hydrocarbons such as carbon tetrachloride or tetrachloroethylene, or a mixture of the same and methylene chloride. When the alkenyl aromatic resin is initially dissolved in a polychlorinated hydrocarbon other than methylene chloride, it is necessary that methylene chloride be introduced together with the sulphur trioxide, e. g. as a solution of sulphur trioxide in methylene chloride, in order to supply the methylene chloride, which is required in the reaction mixture. The combined weight of the sulphur trioxide and alkenylaromatic resin starting materials corresponds to from 0.5 to 10, usually from 2 to 5, per cent of the weight of the reaction medium.

It is important that the sulphur trioxide and the alkenyl aromatic resin be employed in the relative proportions hereinbefore mentioned. Employment of appreciably less than 0.8 molecular equivalent of sulphur trioxide per equivalent of the resin usually results in formation of a water-insoluble resin sulfonate, whereas employment of considerably more than 3 molecular equivalents of sulphur trioxide per molecular equivalent of the resin usually results in formation of a dark-colored gummy resin sulfonate. From 1 to 2 molecular equivalents of sulphur trioxide are preferably employed per equivalent of the resin.

Use of a total weight of sulphur trioxide and resin starting material significantly greater or less than the specified range of 0.5 to 10 per cent of the weight of the methylene chloride-containing medium usually results in formation of a product which is insoluble, or only partially soluble, in water.

It is important that the sulfonation be carried out under substantially anhydrous conditions. Minor amounts of water, e. g. up to about 100 parts by weight of water per one million parts of the liquid medium, may be tolerated. However, water in any proportion is objectionable because it reacts with the sulphur trioxide, correspondingly reducing the quantity of sulphur trioxide available for the sulfonation reaction, and produces sulphuric acid by reaction of water and sulphur trioxide. The sulphuric acid may cause formation of other undesirable by-products and impurities and, when the resin sulfonate is converted to a neutral metal salt, gives rise to inorganic sulfate salts which contaminate the water-soluble neutral salts of the sulfonated resin products.

The sulfonation reaction may be carried out batchwise, or in a continuous manner. For instance, the diluted sulphur trioxide may be added gradually to a solution containing all of the resin which is to be sulfonated, or a stream of the diluted sulphur trioxide and a stream of the resin solution may be fed into admixture with each other at rates corresponding to from 0.8 to 3 molecular equivalents of sulphur trioxide per equivalent of the resin. During an operation of gradually adding sulphur trioxide to the resin solution, the viscosity of the reaction mixture increases up to a point at which from 0.4 to 0.6 chemical equivalent of sulphur trioxide has been added per equivalent of the resin. The viscosity then decreases upon addition of further amounts of sulphur trioxide. These changes in viscosity are believed due to a precipitation of sulfonated resin in the form of swollen particles during addition of the first portion of sulphur trioxide, followed by shrinkage of the precipitated particles as further sulfonation occurs on addition of the remainder of the sulphur trioxide. When separate streams of the sulphur trioxide and the resin solution are caused to flow into admixture with each other in the proportions and under the conditions hereinbefore given, all stages of the reaction appear to occur concurrently, i. e. the resin sulfonate is precipitated as the reactants come in contact with each other and the above-mentioned changes in viscosity of the reaction mixture are not observed. The resin sulfonate product is obtained as a slurry of individual particles, or granules, in the methylene chloride reaction medium and may be separated from the liquor by filtration.

The solid resin sulfonates so obtained are strongly acidic, water-soluble resin sulfonic acids. They may be converted to salts, e. g. by treatment with alkaline materials. The ammonium and alkali metal, e. g. sodium and potassium, salts are water-soluble. Neutral salts prepared from the products of the present sulfonation process contain only minor amounts of inorganic salts, e. g. metal sulfates and chlorides. Aqueous solutions of the neutral salts of resins sulfonated by this method can be cast as films and dried to obtain clear films of good color and appearance and having good strength.

The following examples describe a number of ways in which the invention has been practiced and illustrates certain of its advantages, but are not to be construed as limiting its scope.

EXAMPLE 1

A solution was prepared by dissolving 100 grams of polystyrene (having an average molecular weight of approximately 32,000 as determined by the well known Staudinger Viscosity method) in 1,260 grams of methylene chloride. A separate solution was prepared by dissolving 100 grams of sulphur trioxide in 1,260 grams of methylene chloride. Both of the solutions were cooled to approximately 6° C. and were fed into a reaction vessel which initially contained 2,280 grams of methylene chloride at a temperature of about 6° C. The rates of feed of the two solutions were approximately equal and were such that the time of feed of the solutions to the reaction vessel was about 10 minutes. During the feed of the solutions, and for about 5 minutes thereafter, the mixture in the vessel was stirred vigorously and maintained at temperatures between 6° and 16° C. There was thus produced a slurry of granular sulfonated polystyrene in the liquid reaction medium. A portion of the slurry was filtered to separate the sulfonated polystyrene and the latter was washed with diethyl ether for purpose of extracting any acid-acting inorganic impurities therefrom and was dried. The polystyrene sulfonic acid was dissolved in water to form a 2 per cent by weight solution thereof. This solution was clear, colorless, and had a pH value of 1.4. Its viscosity at 25° C. was about the same as that of water.

EXAMPLE 2

Approximately 160 grams of a solid homo-polymer of ar-vinyltoluene was dissolved in 1,319 grams of methylene chloride. The solution was cooled to about 0° C. and another pre-cooled solution of 141.4 grams of sulphur trioxide in 2,687 grams of methylene chloride was fed thereto, while vigorously stirring and cooling the mixture to maintain the same at temperatures of from 0° to 14° C. There was thus formed a slurry of granular sulfonated polymer in the methylene chloride. The surry was filtered to separate the resin sulfonic acid and the latter was washed with diethyl ether and dried. A portion of the resin sulfonic acid was dissolved in water to form an aqueous solution containing 2 per cent by weight of the same. This solution had a viscosity of 22 centipoises at 25° C., and a pH value of 1.5 at the same temperature.

EXAMPLE 3

A solution of 15.2 grams of sulphur trioxide in 100 cc. of methylene chloride was added rapidly and at about room temperature to a solution of 17.8 grams of a solid homo-polymer of alpha-methylstyrene in 400 cc. of methylene chloride while vigorously stirring the resultant mixture. During mixing of the two solutions, the polymer became sulfonated to form a granular resin sulfonic acid. The reaction mixture was filtered to separate the resin sulphonic acid and the latter was washed with diethyl ether and dried. A portion of the resin sulfonic acid was dissolved in water to form an aqueous solution containing 2 per cent by weight of the same. This solution had a viscosity of 350 cps. at 25° C. and a pH value of 2.1 at the same temperature.

EXAMPLE 4

This example is presented for purpose of comparing the results obtained in a sulfonation carried out in the presence of methylene chloride as a reaction medium with the results obtained in a similar sulfonation carried out using carbon tetrachloride as the reaction medium. Polystyrene, having an average molecular weight of approximately 32,000 was employed as a starting material in both of the experiments. In the experiment which was carried out using methylene chloride as a reaction medium, there were prepared a solution of about 3 per cent by weight of polystyrene in methylene chloride and a separate solution of about 3 per cent by weight of sulphur trioxide in methylene chloride. The two solutions were simultaneously fed into the bottom section of a reaction vessel where they became admixed, and the mixture was caused to flow upward through the vessel while vigorously stirring the same and maintaining it at temperatures of from 25° to 35° C. The polystyrene was thereby sulfonated and caused to separate as granules of a polystyrene sulphonic acid. The resultant slurry over-flowed from the reaction vessel to a receiving vessel for collecting the product. Operation in this manner was continued for a period of 8 hours. The polystyrene sulphonic acid product was neutralized with sodium hydroxide to convert the same to its sodium salt. A portion of the sodium polystyrene sufonate was analyzed to determine the proportions of sodium sulphate and of sodium chloride contained as impurities therein. Another portion of the sodium polystyrene sulfonate product was dissolved in water and the aqueous solution was cast as a thin film, which was dried. The film was tested to determine its tensile strength. The experiment in which carbon tetrachloride was employed as a reaction medium was carried out in a manner similar to that just described, except that the starting solution of liquid sulphur trioxide in carbon tetrachloride was formed by admixing streams of sulphur trioxide and carbon tetrachloride and the solution was fed to the reaction as it was formed. This modification of the procedure was necessary due to the fact that sulphur trioxide reacts fairly readily with carbon tetrachloride and, therefore, the solution cannot satisfactorily be prepared and stored prior to use. The following table identifies each experiment by naming the reaction medium which was employed. It gives the appearance and the tensile strength of the dried film of the sodium salt of the polystyrene sulfonic acid which was obtained. It also gives the proportions, as per cent by weight, of sodium sulfate and of sodium chloride contained in the sodium polystyrene sulfonate product.

Table

| Run No. | Sulfonation Medium | Appearance of of Film | Tensile Strength of Film (lb./sq. inch) | Percent Inorganic Salts in Product | | |
|---|---|---|---|---|---|---|
| | | | | Percent Na$_2$SO$_4$ | Percent NaCl | Total |
| 1 | ClCl$_4$ | Cloudy | 1,349 | 25 | 10 | 35 |
| 2 | CH$_2$Cl$_2$ | Clear as glass. | 3,110 | 10 | 0 | 10 |

EXAMPLE 5

A solution of 31.2 grams of sulphur trioxide in 1,976 grams of methylene chloride was cooled to approximately 0° C. and added with stirring to a solution of 31.2 grams of polystyrene in 5,585 grams of carbon tetrachloride, which latter solution had been pre-cooled to about 0° C. The reaction mixture was maintained at temperatures between 0° and 2° C. by external cooling during addition of the sulphur trioxide solution. During addition of the sulphur trioxide solution, a rapid sulfonation reaction took place with resultant formation and separation of a polystyrene sulfonic acid in granular form. The polystyrene sulfonic acid was separated by filtration, washed with diethyl ether, and dried. A portion of the polystyrene sulfonic acid was dissolved in water to form a clear solution containing 2 per cent by weight of the product. This solution had a pH value of 1.45 at 25° C. and a viscosity of 122 centipoises at the same temperature.

I claim:

1. A method which comprises forming a solution of an alkenyl aromatic resin in a liquid consisting of polychlorinated aliphatic hydrocarbon material, forming another solution of sulphur trioxide in several times its volume of a substantially inert fluid diluent selected from the group consisting of methylene chloride, nitrogen and dry air, there being present, in at least one of said solutions, methylene chloride in amount corresponding to at least 20 per cent of the total weight of polychlorinated aliphatic hydrocarbon material in all of the starting materials, and admixing the two solutions while agitating and maintaining the mixture at reaction temperatures between −20° and 45° C., the sulphur trioxide being employed in a proportion corresponding to that theoretically required for introduction of an average of from 0.8 to 3 sulfonic acid radicals into the resin per aromatic nucleus of the latter, the combined weight of the sulphur trioxide and alkenyl aromatic resin starting materials being such as to correspond to between 0.5 and 10 per cent of the weight of the reaction mixture, and the liquid polychlorinated aliphatic hydrocarbon material serving as a reaction medium.

2. A method as claimed in claim 1, wherein the alkenyl aromatic resin is dissolved in a portion of the reaction medium, the sulphur trioxide is used in amount corresponding to that theoretically required for introduction of an average of from 0.8 to 2 sulfonic acid radicals into the resin per aromatic nucleus of the latter and is dissolved in another portion of the reaction medium, the two solutions thus formed are caused to flow into admixture with one another, and the combined weight of the sulphur trioxide and alkenyl aromatic resin starting materials corresponds to from 2 to 5 per cent of the weight of the reaction mixture.

3. A method, as claimed in claim 2, wherein the medium consists essentially of methylene chloride.

4. A method, as claimed in claim 2, wherein the alkenyl aromatic resin is polystyrene.

5. A method, as claimed in claim 2, wherein the alkenyl aromatic resin is a polymer of ar-methylstyrene.

6. A method, as claimed in claim 2, wherein the alkenyl aromatic resin is a polymer of alpha-methylstyrene.

7. A method, as claimed in claim 2, wherein the reaction medium consists essentially of methylene chloride and the alkenyl aromatic resin is polystyrene.

8. A method, as claimed in claim 2, wherein the reaction medium consists essentially of methylene chloride and the alkenyl aromatic resin is a polymer of ar-methylstyrene.

9. A method as claimed in claim 2, wherein the reaction medium consists essentially of methylene chloride and the alkenyl aromatic resin is a polymer of alpha-methylstyrene.

References Cited in the file of this patent

UNITED STATES PATENTS

| 2,533,211 | Baer | Dec. 12, 1950 |
| 2,691,644 | Roth | Oct. 12, 1954 |